US006726971B1

(12) United States Patent
Wong

(10) Patent No.: US 6,726,971 B1
(45) Date of Patent: Apr. 27, 2004

(54) THERMALLY STABLE CLEAR POLYURETHANE ADHESIVE TAPE

(75) Inventor: Wilkey Wong, Coventry, RI (US)

(73) Assignee: Tyco Adhesives LP, Norwood, MA (US)

( * ) Notice: Subject to any disclaimer, the term of this patent is extended or adjusted under 35 U.S.C. 154(b) by 0 days.

(21) Appl. No.: 09/459,821

(22) Filed: Dec. 13, 1999

(51) Int. Cl.$^7$ .................................................. C09J 7/02
(52) U.S. Cl. .................. 428/40.1; 428/41.3; 428/423.1; 428/423.3; 428/906; 428/920; 428/921
(58) Field of Search ............................... 428/40.1, 41.3, 428/906, 920, 921, 423.1, 423.3

(56) References Cited

U.S. PATENT DOCUMENTS

| | | | | |
|---|---|---|---|---|
| 4,374,883 A | | 2/1983 | Winslow | 428/40.1 |
| 5,178,938 A | * | 1/1993 | Magistro | 428/252 |
| 5,326,605 A | | 7/1994 | Ono et al. | 428/40.1 |
| 5,750,630 A | | 5/1998 | Sengupta | 528/59 |
| 5,807,637 A | | 9/1998 | Schümann et al. | 428/423.1 |
| 5,827,598 A | * | 10/1998 | Larsen | 428/131 |
| 5,858,495 A | | 1/1999 | Eikmeier et al. | 428/40.1 |
| 5,910,536 A | * | 6/1999 | Kydonieus | 524/590 |

FOREIGN PATENT DOCUMENTS

| | | |
|---|---|---|
| EP | 0304214 | 2/1989 |
| WO | WO 96/14208 | 5/1996 |

OTHER PUBLICATIONS

International Search Report in EP 00 12 7051 Database WPI, Section Ch, Week 198718, Derwent Publicationa Ltd., London, GB.

* cited by examiner

Primary Examiner—Nasser Ahmad
(74) Attorney, Agent, or Firm—Tyco Healthcare Group LP

(57) ABSTRACT

Flame retardant, clear pressure-sensitive adhesive tape comprises clear polyether-based polyurethane backing film and clear, polyether-based polyurethane pressure sensitive adhesive coated on one side of the backing film. Flame retardant is incorporated into the polyurethane backing film and the polyurethane adhesive to render the tape substantially flame retardant without causing a loss of the substantial transparency of the tape. The tape meets the following flame retardancy requirements: maximum average burn extinguishing time of 15 seconds, maximum average burn length of 8 inches and maximum average drip extinguishing time of 5 seconds, measured in accordance with defined test methods.

10 Claims, No Drawings

THERMALLY STABLE CLEAR POLYURETHANE ADHESIVE TAPE

INTRODUCTION

This invention relates to pressure-sensitive adhesive tape and, more particularly, to polyurethane adhesive tape which is both clear and thermally stable or flame retardant.

BACKGROUND

Pressure sensitive adhesive tapes, including both roll tape and sheet forms, have long been prepared both as general purpose tapes and as specialty tapes. For applications where optical clarity or adhesive bond longevity is required, acrylic or silicone pressure-sensitive adhesives have traditionally been used. In certain applications, however, such traditional materials do not meet the performance and cost requirements. In particular, for example, various aeronautical applications are found to require pressure-sensitive adhesive tape which meet requirements for low flamability. More specifically, certain applications, especially certain aeronautical applications call for pressure-sensitive adhesive tape having maximum average burn extinguishing time of 15 seconds, maximum average burn length of 8 inches and maximum average drip extinguishing time of 5 seconds, measured in accordance with BSS 7230 Method F2 (12 seconds vertical) published by Boeing Company, (Seattle, Wash., U.S.A.) and set forth in substantial portion as test method 6, below.

Existing tapes meeting such stringent requirements have been found to have shortcomings in other respects. Most notably, it has now been recognized that pressure-sensitive adhesive tape meeting the above-stated thermal stability requirements would and other physical property requirements would also advantageously be substantially clear or transparent. In addition, in certain applications the substantially clear, thermally stable tape must also meet physical property requirements such as weight, elongation, tensile strength, peel,strength, water vapor impermeability, environmental resistance, moisture absorption and puncture resistance. A self-adhesive tape is described in U.S. Pat. No. 5,807,637, which is said to be capable of gap-bridging sealing functions and to form bonds which are stable at both high and low temperatures. Specifically, a double-sided tape is described, based on a cross-linked, non-foam polyurethane substrate. The adhesive compositions suggested for this double-sided tape are known adhesive compositions based on rubber or acrylate chemistry. A high quantity of fillers are employed, however, which are said to contribute to the permanent bond strength achieved by the double sided tape. Fillers such as carbon black, chalk, zinc oxide and the like are disclosed which would render the tape non-transparent. In addition, the cross-linked polyurethane employed in U.S. Pat. No. 5,807,637 would be expected to render the tape undesirably brittle. Adhesive tape employing a polyurethane acrylate layer is described in U.S. Pat. No. 5,858,495 to have a high degree of three-dimensional cross-linking, with resulting brittleness sufficient to prevent removal of the tape from a substrate except in small segments. The pressure sensitive adhesive tape of U.S. Pat. No. 5,858,495 also employs pigment, such that it would not be substantially transparent.

It is an object of the present invention to provide substantially clear adhesive tape which is thermally stable, that is, meeting the above-stated specifications for flame retardancy. It is an object of at least preferred embodiments of the invention to also meet certain physical property requirements. These and other objects of the present invention will be better understood from the following disclosure of the invention and detailed description of certain preferred embodiments.

SUMMARY

In accordance with one aspect, the present invention provides thermally stable, clear, pressure-sensitive adhesive tape comprising a clear polyether-based polyurethane backing film and clear, polyether-based polyurethane pressure-sensitive adhesive coated on one side of the backing film. The polyurethane backing film and/or the polyurethane adhesive incorporates flame retardant effective to render the tape substantially flame retardant. As used here and in the appended claims, the term "flame retardant" means that the pressure-sensitive adhesive tape disclosed here meets the above-stated requirements for thermal stability, specifically, having maximum average burn extinguishing time of 15 seconds, maximum average burn length of 8 inches and maximum average drip extinguishing time of 5 seconds, measured in accordance with BSS 7230 Method F2 (12 seconds vertical) published by Boeing Company and set forth in substantial part as Test Method 6, below. Preferably, both the polyurethane backing film and the solvent based polyurethane incorporate a flame retardant additive.

The term "clear" or "substantially clear" as used here and in the appended claims, means that the PSA tape disclosed here, as applied to the substrate, is substantially transparent, preferably being sufficiently transparent for a person applying the tape to a substrate to view the perimeter of any air bubbles trapped between the tape and the substrate, to which it has been applied, and to view a gap or seam in the underlying substrate through the applied tape and read 12 point OCRA Extended typeface printing. Although the PSA tape disclosed here most preferably is colorless, it optionally may be tinted with color and, nevertheless, be substantially transparent, that is, "clear" as that term is used here.

It will be recognized by those skilled in the art, i.e., those skilled in the field of pressure-sensitive adhesives tapes, that the present invention represents a useful technological advance. More specifically, as further discussed below in connection with certain preferred embodiments, the clear polyurethane backing film and clear, pressure sensitive polyurethane adhesive coated on one side of the polyurethane backing film provides performance characteristics meeting the requirements of certain end use applications, including certain aeronautical applications. In particular, certain preferred embodiments of the adhesive tapes disclosed here provide advantageous performance both in being applied to a substrate and in subsequent performance. More particularly, as noted above, the pressure-sensitive adhesive tapes disclosed here meet the thermal stability requirements applicable to certain aeronautical applications, as well as uses such as floor panel joint protection, galley area floor membrane and lead edge protection. Moreover, it is a particular advantage of the adhesive tapes disclosed here, that they are clear, that is, substantially transparent. This enables air bubbles trapped under the tape to be viewed during application of the tape, so that the air bubbles can be removed to provide better adhesive bonding of the tape to the substrate. In addition, it is possible to view through the tape to observe the location of a seam or gap or the like being sealed by application of the tape, such that the tape can be better centered or otherwise positioned along the seam as it is applied. In addition, it is possible to view through the tape to observe alignment marks or part identification numbers as an additional safeguard to proper assembly of the structure. Additional features and advantages of the invention will be better understood from the following detailed description of certain preferred embodiments.

DETAILED DESCRIPTION OF CERTAIN PREFERRED EMBODIMENTS

The preferred embodiments described here in detail have a clear polyether-based polyurethane backing film. Most preferably, the backing film is a mono-layer backing, that is, a backing formed as a single layer of clear, substantially non-crosslinked polyether-based polyurethane rather than being constructed as a laminate of multiple layers. Suitable materials for the backing film include, for example, polyurethane X-1656 from Deerfield Urethane, Inc. Whately, Mass. and Stevens Urethane, Holyoke, Mass. Other suitable polyether-based polyurethanes for the clear backing film of the PSA tapes disclosed here are commercially available or can be prepared in accordance with known materials, equipment and processes, and will be apparent to those skilled in the art, given the benefit of this disclosure.

As disclosed above, the thermally stable, clear adhesive tape disclosed here incorporates flame retardant. Flame retardant incorporated into the clear polyurethane backing film material must be compatible with the polyurethane material of the backing film and, in particular, must not interfere with the substantial transparency and other performance characteristics of the backing film. Exemplary flame retardants suitable for use in the polyurethane backing film materials disclosed above include FIRE MASTER™ HP-36 available from Great Lakes Chemical Corporation, Wilmington, Del., and other commercially available flame retardants such as Reotos 3600 and Kronitex TBP. Additional commercially available flame retardants and other materials suitable for use in the clear polyurethane adhesive tapes disclosed here will be apparent to those skilled in the art in view of the present disclosure. The flame retardant is employed in an amount sufficient, acting together with flame retardant incorporated in the polyurethane adhesive discussed further below, such that the clear adhesive tape meets the requirements of having maximum average burn extinguishing time of 15 seconds, maximum average burn length of 8 inches and maximum average drip extinguishing time of 5 seconds, measured in accordance with BSS 7230 Method F2 (12 seconds vertical) published by Boeing Aircraft Company. The backing is preferably polyether polyurethane having ASTM D-2240 Shore A hardness of at least 85, ASTM D-882 100% modulus of at least 900 psi, ASTM D-1525 Vicat softening temperature of at least 165° F., ASTM D-470 split tear strength of at least 125 lb/inch, glass transition temperature between −65° F. and −25° F., and ASTM D-1044 Taber abrasion of between 2 and 10 mg/1000 cycles.

Optionally, additional additives may be employed in the polyether-based polyurethane material of the backing film. All such additives must be compatible with the polyurethane and must not interfere with the substantial transparency, flame retarding properties or other performance characteristics of the tape. Exemplary additives include colorants, antiblocking agents and processing lubricants. Additional additives suitable for use in the clear polyurethane adhesive tapes disclosed here will be apparent to those skilled in the art in view of the present disclosure.

The thermally stable, clear adhesive tape further comprises clear, pressure-sensitive, solvent-based polyether-based polyurethane adhesive coated on one side of the backing film. The pressure-sensitive polyurethane adhesive preferably is applied as a single layer, that is, a mono-layer, on a mono-layer polyurethane backing film, rather than being constructed as multiple layers of different adhesives, both to provide simplicity and cost-advantage in the manufacture of the tape and to maintain good transparency. The polyurethane adhesive preferably is of polyether polyurethane type with specific gravity between 1.0 and 1.25 and is readily solvated for liquid coating. Suitable solvents for use in the pressure sensitive polyurethane adhesive include, for example, those which readily dissolve the pressure sensitive polyurethane adhesive and are readily driven off in the range of drying temperatures between 175° F. and 325° F. Exemplary solvents suitable for use in the clear adhesive tapes disclosed here include toluene, isopropyl alcohol and ethyl acetate. The amount of solvent used preferably is 30–70% by weight. Additional and alternative solvents suitable for the clear, flame regardant PSA types of the present invention will be apparent to those skilled in the art in view of the present disclosure.

Flame retardant incorporated into the clear, polyether-based polyurethane adhesive must be compatible with the polyurethane material of the adhesive and with the other components of the PSA tape. In particular, it must not interfere with the substantial transparency and performance characteristics of the adhesive tape. Exemplary flame retardants suitable for use in the polyurethane adhesive include those described above. Additional commercially available flame retardants and other flame retardant materials suitable for use in the polyurethane adhesive of the clear, flame retardant PSA adhesive tapes disclosed here will be apparent to those skilled in the art given the benefit of the present disclosure.

Optionally, additional additives may be employed in the polyurethane adhesive. All such additives must be compatible with the polyurethane adhesive and the other components of the PSA tape, and must not interfere with the substantial transparency, flame retarding properties or other performance characteristics of the tape. Exemplary additives include tackifiers, reinforcing agents and colorants. Additional optional additives will be apparent to those skilled in the art given the benefit of the present disclosure.

The polyurethane adhesive can be applied to the polyurethane backing film, preferably as a mono-layer as indicated above, by any suitable method. Exemplary methods include, for example, reverse roll coating, knife over roll coating and slot die coating. The thickness of the adhesive on the backing film typically will be about 0.5 mil to 10 mil, more preferably about 1 mil to 4 mil, for example, about 2.5 mil. The thickness of the adhesive layer will vary with any particular tape of the present invention, depending, in part, on the particular end use application for which it is intended. In accordance with certain preferred manufacturing techniques, elongate, wide sheets of the polyether-based polyurethane backing film is are coated with the polyether-based polyurethane adhesive, after which the adhesive coated backing film is cut longitudinally to desired tape widths and then rolled, optionally, with a release liner.

As used here and in the appended claims, reference to the pressure-sensitive adhesives tapes disclosed here as being "clear" should be understood to mean that the adhesive tape will be substantially clear as applied to the intended substrate. Even prior to application, however, the tape is sufficiently clear to permit viewing of a seam line or the like as it is being applied, notwithstanding a possible minor frosted appearance or the like. The combination of solvent-based polyether-based polyurethane adhesive coated on the clear polyether-based polyurethane backing film discussed above is found to provide excellent performance characteristics, especially well-suited to aeronautical applications such as seam sealing. In particular, this novel combination of materials, in addition to providing the advantages of a clear PSA tape, is found to have excellent performance characteristics. Certain especially preferred embodiments, in addition to being clear and having the requisite flame retardancy, are found to have the following physical properties and performance characteristics:

TABLE A

| PROPERTY | PERFORMANCE VALUE | TEST METHOD |
|---|---|---|
| WEIGHT (ozs/ft$^2$) Maximum Average | 1.2 | 1 |
| THICKNESS, Mil, Minimum Average | 9 | 1 |
| ELONGATION Percent, Minimum, Average. | 600 | 2 |
| TENSILE STRENGTH, (psi) Minimum | 6500 | 2 |
| 180 DEGREE PEEL (Pounds/inch of Width), Minimum Average | | 3 |

| | Environmental Condition | | |
|---|---|---|---|
| Test Substrate | Room Temp. | 160° F. Circ. Air | 120° F. 95 RH |
| Aluminum FLL 1 | 1.7 | 3.4 | 4.4 |
| BMS4-17 | 5.0 | 7.50 | 5.0 |

| PROPERTY | PERFORMANCE VALUE | TEST METHOD |
|---|---|---|
| WATER VAPOR TRANSMISSION RATE (grams/100 inch$^2$) maximum average | 7.5 | 4 |
| ENVIRONMENTAL RESISTANCE | No delamination and bubbling discoloration or embrittlement beyond that identified at installation | 5 |
| MOISTURE ABSORPTION, (Percent weight gain) Maximum, Average | 0.50 | 7 |
| PUNCTURE (lbs.) Minimum Average | 85 | 8 |

These especially preferred embodiments, as recited in the table above, have elongation to break of at least 600% and tensile strength of 6,500 psi. Certain embodiments of the clear tape disclosed here achieve at least 675% elongation, and in some embodiments even achieve 775% elongation. Also, certain embodiments achieve at least 7250 lbs/sq. inch and in some embodiments even achieve 8100 lbs/sq. inch. Also, certain embodiments achieve at least 100 pounds puncture test values. The test methods 1 through 8 referred to in Table A above are set forth below in the section under the heading EXAMPLES.

For certain end-use applications, including certain seam sealing applications in aeronautical construction, the pressure-sensitive, solvent-based polyurethane adhesive advantageously has the following performance characteristics: tackiness, high adhesion and shear creep resistance. Preferred embodiments of the thermally stable clear adhesive tapes disclosed here can meet the foregoing performance requirements, as illustrated in the following examples.

EXAMPLES

Example 1

Thermally stable, clear pressure-sensitive adhesive tape in accordance with the present invention was prepared as follows. Combine 100 parts of Mace Adhesives PSA 2-25-3 with 2 parts Stahl Crosslinker XR-2500. Mix for 5 Minutes. Apply coating to 8 mil Deerfield Urethane X-1656 polyether polyurethane film. Dry in an air convection over at 275° F. for 3 minutes.

The resulting thermally stable, clear pressure sensitive adhesive tape was tested. Specifically, the following tests were performed.

TEST METHODS

The following section describes the methods for testing the clear, flame retardant PSA adhesive tapes disclosed here. Damage to the tape edges may bias test results. When cutting tape to size use methods described in ASTM D 1000, specimen preparation.

1. Thickness and Weight
   Determine the adhesive weight and thickness as follows:
   a. Weight: Condition three rolls for 24±2 hours at 75±5 F and 50±5 percent relative humidity. Determine the total weight of tape to the nearest 0.001 gram of a two by three inch (nominal) sample. Divide the measured weight by the measured sample area. Average the results of five specimens and report the weight in ounces per square foot.
   b. Thickness: Determine the average adhesive thickness by measuring every 8 inches across the roll width (or by taking a minimum of 5 separate measurements) using a convenient thickness indicator with the minimum range of 0 to 0.050 inch and graduated in increments. The measuring device shall apply a steady pressure of 7.0 to 9.0 psi to the tape.

2. Tensile Strength and Elongation
   Perform test in accordance with ASTM D 3759. Report the individual and average values for 5 specimens.

3. 180-Degree Peel Strength
   3.1 ALUMINUM
   a. Prepare the substrate: 2024 any temper bare aluminum sheet 0.060±0.020 inch thick. Do not surface treat the aluminum. Solvent clean the test of each place in accordance with BAC5750 (incorporated hereby reference) and allow to air dry.
   b. Prepare 15 places moisture barrier tape 1.0±0.1 inch wide by 18.000±0.625 inches long and apply to the cleaned aluminum.
   c. Roll a 4.5 pound roller in accordance with ASTM D 1000 over each specimen assembly 10 times in each direction.
   d. Age the coupons at 75±5° F. and 50±5 percent relative humidity ("RH") for 24±2 hours. Following aging, condition five specimens in each of te environments listed.
      (1) 75° F. and 50±5 percent RH for 24 hours ±2 hours.
      (2) 160° F. circulating air oven for 7 days ±4 hours.
      (3) 120° F. and 95±5 percent Condensing Humidity for 7 days ±4 hours.
   e. Allow specimens conditioned in accordance with Test Method .3.1d.(1) and .31d.(2) a minimum of 2 hours and a maximum of 4 hours to come to room temperature prior to testing. Allow specimens conditioned in accordances with Test Method .31d.(3) 24±2 hours to come to room temperature prior to testing. Excess moisture may be blotted using clean gauze upon removal from the conditioning chamber.
   f. In accordance with ASTM D 903, use a nominal rate of 12 inches per minute crosshead speed. Report the individual and average peel strength in pounds per inch of width (PIW) for each set of five specimens.
   3.2 BMS4-17 SUBSTRATE
   a. Obtain the substrate:
      (1) BMs4-17 Type VI Floor Panel Stock
   b. Prepare 15 pieces of each floor panel type 1.50 wide by 8 inches long (Nominal).
   c. Prepare 30 pieces moisture barrier tape 1.0±0.1 inch wide by 16.000±0.625 inches long. Proceed as set forth in Section 8.3.1 through 8.3.1f.
   Substrate specification BMS4-17, published by Boeing Co., are incorporated herein by reference.

4. Water Vapor Transmission Rate
   Perform test in accordance with ASTM D 3833.

5. Environmental Resistance
   a. Obtain 4 panels 6.0±0.2 BY 12.0±0.02 by 0.50±0.025 inches thick; two panels in accordance with BMS4-17 Type VI and two panels fabricated. Clean one side of each panel in accordance with BAC5750. Solvent cleaning method BAC5750, published by Boeing Aircraft Co., is incorporated herein by reference.
   b. Apply the moisture barrier tape in 2 inch wide strips across the 6 inch (nominal) width of the clean substrate surface. Overlap each splice approximately 1 inch. Using only firm hand pressure apply the tape in a manner to minimize the entrapment of air. Insure the lengthwise edges of the tape are bonded to the underlying panel or tape. Identify any areas of entrapped air or lack of bonding to substrate by marking the defect perimeter with a waterproof pen.
   c. Age the specimen at 75±5 and 50±5 percent relative humidity for 24±2 hours.
   d. Put one specimen of each panel type in 120°±10° F. condensing humidity chamber and one specimen of each floor panel type in hot air circulating over at 160±10 F for 7 days ±4 hours.
   e. At the end of the exposure period, blot the surface of the wet specimen with clean gauze and allow all of the specimens to lay flat for 24±2 hours at room temperature prior to checking for tape defects such as discoloration or embrittlement, bubbling or delamination beyond that which was present at specimen assembly.
6. Flamability
   Prepare specimens and test in accordance with BSS7230 Method F2, 12 second vertical. The following definitions are used:
   After glow Time—The length of time, in seconds, that the specimen continues to glow or smolder, without flaming combustion, after any flaming combustion ceases following the removal of the ignition flame.
   Burn Length—The distance from the original specimen edge to the farthest point showing evidence of damage due to that area's combustion, including areas of partial consumption, charring, or embrittlement, but not including areas sooted, stained, warped, or discolored, nor areas where material has shrunk or melted away from the heat.
   Drip Extinguishing, Time—The time in seconds that any flaming material continues to flame after falling from the test specimen to the floor of the test chamber. If there is more than one drip, the drip extinguishing time reported is that of the longest flaming drop. If succeeding flaming drips reignite earlier drips that flamed, the drip extinguishing time reported is the total of all flaming drips.
   Extinguishing Time—The total time, in seconds, that the test specimen continues to burn with a flame after removal of the ignition source. Surface burning that results in glowing or smoldering but not in a flame is not included.
   Flame Penetration—Flame penetration occur if the flame penetrates (passes through) the test specimen during the Method F5, 45-degree test, through a hole or crack in the specimen that forms during ignition. Flaming combustion on the top of the specimen that results from auto ignition is not considered flame penetration in this test.
   Ignition Time—The length of time, in seconds, that the burner flame is applied to the test specimen.

TEST SPECIMEN REQUIREMENTS

NUMBER OF SPECIMENS

A minimum of three specimens per set shall be tested for each material or part. For parts that may have different flamability characteristics in different direction (e.g., fabrics and carpets), two sets of specimens, out from each direction showing the greatest difference (e.g., warp and fill for woven fabrics), shall be provided and tested separately.

SPECIMEN SELECTIONS a. Specimens tested shall be either cut from a fabricated part as installed in the aircraft or out from a flat section simulating the construction of a fabricated part. Fabricated units, such as sandwich panels, shall not be separated into individual component layers for testing.
b. The edge of the specimen to which the burner is to be applied for vertical and horizontal test methods (Method F1, F2, F3, F4 and F7) shall not be finished or have a protected edge, but shall be representative of the actual cross section of the material or part installed in the airplane.
c. if both sides of a part are exposed as installed in the airplane (e.g., partitions) and if the material on one side of the part is different from the material on the other side, then a set of specimens shall be provided to test each surface.

SPECIMEN SIZE a. For the vertical and horizontal test methods (F1, F2, F3, F4 and F7), specimens shall be nominally 3 and 12 inches (76 by 305 mm) in size. If the actual part size is smaller than the standard specimen size, the actual part size may be used. Alternatively, test specimens larger than the actual part size may be used provided they are of the same construction as the part.
b. For the 45-degree test method (F5), specimens shall be nominally 10 by 10 inches (250 by 250 mm) in size.

SPECIMEN THICKNESS

The specimen thickness shall be the same as that in the part qualified for use in the airplane, except for the following.
TYPES F1, F2, F5, F7
a. If the part construction is used in several thicknesses, the minimum and maximum thickness shall be tested.
b. Foam parts that are thicker than 0.5 inch (13 mm) (e.g., seat cushions), shall be tested in 0.5 inch (13 mm) thickness.
c. Parts that are smaller than the size of a specimen and cannot have specimens cut from them, may be tested using a flat sheet of the material sued to fabricate the part, in the actual thickness used in the airplane.
TYPES F3, F4
a. The specimen thickness shall be not thicker than the minimum thickness to be qualified for use in the airplane. If the part thickness is greater than 0.125 inch (3.2 mm), the thickness used for the test specimen shall not exceed 0.125 inch (3.2 mm).
b. Parts that are smaller than the size of a specimen and cannot have specimens cut from them may be tested using a flat sheet of the material used to fabricate the part in the actual thickness used in the airplane. For Test Method F4, if the part thickness is greater than 0.125 inch (3.2 mm), the thickness used for the test specimen shall not exceed 0.125 inch (3.2 mm).

SPECIMEN PREPARATION

For horizontal test specimens (Method F3 and F4), two gage lines shall be marked on the back surface (opposite the surface to be exposed to the flame), perpendicular to the long direction, 1.5 inches (38 mm) and 11.5 inches (282 mm) from the end that will be subjected to the burner flame.

SPECIMEN CONDITIONING

Specimens shall be conditioned at 70°±5° F. (21°±3° C.) and 50±5 percent re humidity for a minimum of 24 hours prior to test. Only one specimen at a time shall be removed from the conditioning chamber immediately before testing.

EQUIPMENT/APPARATUS/MATERIALS

TEST CABINET

Tests shall be conducted in a draft-free cabinet. The vertical test cabinet (F1, F2 and F7) shall be fabricated in accordance with FIG. 1 and FIG. 2 of Boeing Company published test procedure BSS 7230, incorporated herein by reference. The horizontal and 45-degree test cabinet shall be fabricated in accordance with FIG. 3 and FIG. 4 of Boeing Company published test procedure BSS 7230, incorporated herein by reference. The cabinet shall be placed under a hood to remove dangerous fumes and aid in the clearing of smoke after each test. The floor of each chamber shall be nominally 0.040 inch (1 mm) thick stainless steel or other corrosion resistant metal.

SPECIMEN HOLDER

The specimen holders shall be able to accommodate specimens up to 1 inch (25 mm) thick and be fabricated of corrosion resistant metal to the following requirements:

a. Vertical test (F1, F2, F7)—the vertical test specimen holder shall be fabricated in accordance with FIG. 5 of Boeing Company published test procedure BSS 7230, incorporated herein by reference.

b. Horizontal test (F3, F4)—the horizontal test specimen holder shall be fabricated in accordance with FIG. 6 of Boeing Company published test procedure BSS 7230, incorporated herein by reference.

c. 45-Degree Test (F5)—the 45 degree test specimen holder shall be fabricated in accordance with FIG. 7 of Boeing Company published test procedure BSS 7230, incorporated herein by reference and be capable of securely positioning the specimen at a 45-degree angle.

BURNER AND BURNER FUEL

The burner shall be a Bunsen type, having a nominal ⅜ inch (9.5 mm) inside diameter barrel, with a needle valve to adjust the gas flow rate (flame height). Reference is made here to FIG. 8 of Boeing Company published test procedure BSS 7230, incorporated here by reference. The air supply at the bottom of the burner shall be closed. The burner shall be mounted on a sliding track or equivalent device to allow the burner to be moved in and out of fast position from outside of the cabinet.

Methane gas with a minimum purity of 99 percent shall be used as the burner fuel. The gas shall be regulated and delivered to the burner at 2.5±02.5 pal (17±2 kPa) with no air mixing. When properly adjusted, the burner flame will be nominally ⅞ inch (22 mm) tall for the bright blue inner cone and 1½ inches (38 mm) tall for the very faint blue outer cone.

TIMER

A stopwatch or other device, calibrated and graduated to 0.1 second, shall be used to measure the time of application of the burner flame, the flame time, and the drip flame time.

RULER

A ruler or scale calibrated and graduated to 0.1 inch (2.5 mm) shall be provided to measure the burn length.

PROCEDURE

Prepare for each test by setting the gas line pressure to 2.5±0.25 pal (17±2 kPa) and igniting the burner. Adjust the flame so the bright blue inner cone is nominally ⅞ inch (22 mm) tall and the very faint blue outer cone is 1½ inches (38 mm) tall.

VERTICAL TEST (F1, F2, F7)
VERTICAL TEST PROCEDURE a. Position the burner at least 3 inches (76 mm) from the specimen holder.

b. Insert the specimen vertically into the test specimen holder located so the bottom edge of the specimen is nominally ¾ inch (19 mm) above the top of the burner orifice. Close the cabinet door.

c. Set the timer to zero. Simultaneously start the timer and position the burner under the lower edge of the center of the face of the specimen. See FIG. 2.

d. Apply the flame for 12 or 60 seconds depending on the Test method and then withdraw it by moving the burner at least 3 inches (75 mm) away from the specimen.

e. If the flame extinguishes during a F1 test, the flame may be relighted up to 3 times with the ignition times adding up to 60 seconds. If the flame extinguished during a F2 test for any reason, the test shall be rerun. The opposite end of the same specimen may be used for the retest if the burn length for the aborted test is less than 3 inches (78 mm).

f. Note the extinguishing time, afterglow time, and drip extinguishing time. For materials that shrink or melt away from the flame, note the farthest distance that the foot of the flame traveled up the specimen.

g. After the test is complete, open the cabinet door to clear the test cabinet of smoke and fumes.

h. Remove the specimen from the chamber and clean the specimen surface of soot and smoke stains to aid in determining burn length. A soft cloth or tissue dampened with alcohol or other mild solvent which does not dissolve or attack the specimen may be used.

7. Moisture Absorption a. Prepare 5 pieces 2024 (any temper) bare aluminum substrate 1.5000±0.0625 by 4.000±0.0125 by 0.030 inches thick. Clean one side of each substrate in accordance with BAC5750, and allow to air dry.

b. Apply 5 pieces tape 1.00±0.01 by 12.000±0.625 inches to the cleaned surface of the aluminum.

c. Age the specimens 24±2 hours at 75±5 F and 50±5 percent relative humidity.

d. Weigh and record the weight of each specimen to the nearest 0.01 gram.

e. Condition the specimens for 7 days±4 hours at 120±5 F and 95±5 percent relative humidity.

f. Remove the specimens from the conditioning chamber; blot surface moisture with clean gauze and weigh each specimen to the nearest 0.01 gram no longer than 30 minutes after removing from the environmental chamber. Record the individual weight of each specimen. Calculate the average percent weights gain for the 5 specimens.

8. Puncture Resistance

Perform test in accordance with ASTM D 1000, with a plunger with a smaller (0.166 inch diameter) plunger which leaves approximately ⅛ inch (125 mil) clearance in the bore hole rather than 2 mil clearance. The greater clearance is believed to cause puncture with more stretching of the tape rather than shear.

The pressure sensitive adhesive tape made in accordance with this Example 1 is substantially transparent and thermally stable. It is well-suited for use in seam sealing applications in aeronautical construction and achieves the performance values shown in Table A, above.

Example 2

Thermally stable, clear pressure-sensitive adhesive tape in accordance with the present invention was prepared as follows: Combine 100 parts of Mace Adhesive PSA 2-25-3 with 2 parts Mace Crosslinker C-63. Mix for 5 minutes. Apply coating to 8 mil Argotech polyether polyurethane film. Dry in an air convection oven at 275 F for 3 minutes.

The resulting thermally stable, clear pressure sensitive adhesive tape is tested in accordance with the test procedures described above in connection with Example 1, and found to have good properties suitable for use as substantially clear adhesive tape which sufficiently thermally stable to pass test BSS 7230 Method F2.

It will be understood by those skilled in the art from the foregoing disclosure of the invention and detailed description of certain preferred embodiments, that there are variations and alternative embodiments within the scope of the invention as defined by the following claims.

I claim:

1. Thermally stable, clear pressure-sensitive adhesive tape comprising:

clear polyether-based polyurethane backing film; and clear polyether-based polyurethane pressure-sensitive adhesive coated on one side of the backing film;

at least one of the polyurethane backing film and the polyurethane adhesive comprising flame retardant effective to render the tape flame retardant.

2. The thermally stable, clear adhesive tape of claim 1 having maximum average burn extinguishing time of 15 seconds, maximum average burn length of 8 inches and maximum average drip extinguishing time of 5 seconds, all as measured in accordance with BSS 7230 Method F2 (12 seconds vertical).

3. The thermally stable, clear pressure-sensitive adhesive tape of claim 2 meeting or exceeding the following physical property requirements, measured in accordance with the test methods recited in test methods section of the attached specification:

| PROPERTY | TEST VALUE | TEST METHOD |
| --- | --- | --- |
| WEIGHT (ozs/ft$^2$) Maximum Average | 1.2 | 1 |
| THICKNESS, Mil, Minimum Average | 9 | 1 |
| ELONGATION Percent, Minimum, Average. | 600 | 2 |
| TENSILE STRENGTH, (psi) Minimum | 6500 | 2 |
| 180 DEGREE PEEL (Pounds/inch of Width), Minimum Average | | 3 |

| | Environmental Condition | | | |
| --- | --- | --- | --- | --- |
| Test Substrate | Room Temp. | 160° F. Circ. Air | 120° F. 95 RH | |
| Aluminum FLL 1 | 1.7 | 3.4 | 4.4 | 3 |
| BMS4-17 | 5.0 | 7.50 | 5.0 | 3 |

| PROPERTY | TEST VALUE | TEST METHOD |
| --- | --- | --- |
| WATER VAPOR TRANSMISSION RATE (grams/100 inch$^2$) maximum average | 7.5 | 4 |
| ENVIRONMENTAL RESISTANCE | No delamination and bubbling discoloration or embrittlement beyond that identified at installation | 5 |
| MOISTURE ABSORPTION, (Percent weight gain) Maximum, Average | 0.50 | 7 |
| PUNCTURE (lbs.) Minimum Average | 85 | 8 |

4. The thermally stable, clear pressure-sensitive adhesive tape of claim 1 wherein the polyurethane backing film ASTM D-2240 Shore A hardness of at least 85, ASTM D-882 100% modulus of at least 900 psi, ASTM D-1525 Vicat softening temperature of at least 165F, ASTM D-470 split tear strength of at least 125 lb/inch, glass transition temperature between −65F and −25F, and ASTM D-1044 Taber abrasion of between 2 and 10 mg/1000 cycles.

5. The thermally stable, clear, pressure-sensitive adhesive tape of claim 1 wherein the pressure-sensitive adhesive is a solvent-based crosslinked polyether-based polyurethane.

6. The thermally stable, clear pressure-sensitive adhesive tape of claim 1 wherein the clear, polyether-based polyurethane, pressure-sensitive adhesive has specific gravity between 1.0 and 1.25 sg.

7. A roll of thermally stable, clear pressure-sensitive adhesive tape comprising:

clear, non-crosslinked polyether-based polyurethane backing film comprising flame retardant; and clear polyether-based polyurethane pressure-sensitive, adhesive comprising flame retardant, coated on one side of the backing film, said tape having maximum average bum extinguishing time of 15 seconds, maximum average burn length of 8 inches and maximum average drip extinguishing time of 5 seconds, measured in accordance with BSS 7230 Method F2 (12 seconds vertical) published by Boeing Aircraft Company.

8. The thermally stable, clear pressure-sensitive adhesive tape of claim 1 wherein the clear, polyether-based polyurethane backing film comprises flame retardant and the clear polyether-based polyurethane pressure-sensitive adhesive comprises flame retardant.

9. A roll of thermally stable, clear pressure-sensitive adhesive tape comprising:

clear polyether-based polyurethane backing film; and clear polyether-based polyurethane pressure-sensitive adhesive coated on one side of the backing film;

at least one of the polyurethane backing film and the polyurethane adhesive comprising flame retardant effective to render the tape flame retardant.

10. The roll of thermally stable, clear pressure-sensitive adhesive tape of claim 9 wherein the clear, polyether-based polyurethane backing film comprises flame retardant and the clear polyether-based polyurethane pressure-sensitive adhesive comprises flame retardant.

* * * * *